US009552645B2

(12) United States Patent
Ying et al.

(10) Patent No.: US 9,552,645 B2
(45) Date of Patent: Jan. 24, 2017

(54) COMPOUND OBJECT SEPARATION

(75) Inventors: Zhengrong Ying, Peabody, MA (US);
Baoming Hong, Peabody, MA (US);
Ram Naidu, Newton, MA (US)

(73) Assignee: Analogic Corporation, Peabody, MA (US)

( * ) Notice: Subject to any disclaimer, the term of this patent is extended or adjusted under 35 U.S.C. 154(b) by 933 days.

(21) Appl. No.: 13/380,079

(22) PCT Filed: Jun. 30, 2009

(86) PCT No.: PCT/US2009/049236
§ 371 (c)(1),
(2), (4) Date: Dec. 22, 2011

(87) PCT Pub. No.: WO2011/002449
PCT Pub. Date: Jan. 6, 2011

(65) Prior Publication Data
US 2012/0099777 A1 Apr. 26, 2012

(51) Int. Cl.
*G06K 9/00* (2006.01)
*G06T 7/00* (2006.01)
(Continued)

(52) U.S. Cl.
CPC .............. *G06T 7/0081* (2013.01); *G01V 5/005* (2013.01); *G01V 5/0008* (2013.01);
(Continued)

(58) Field of Classification Search
CPC ............ G06T 2207/30112; G06T 2207/10081; G06T 7/0079; G06T 7/0081; G01V 5/0008; G01V 5/0016; G01V 5/0041; G01V 5/005; G06K 9/34; G06K 9/342
See application file for complete search history.

(56) References Cited

U.S. PATENT DOCUMENTS 5,182,764 A 1/1993 Peschmann et al.
5,802,134 A * 9/1998 Larson .................. A61B 6/032
378/15

(Continued)

FOREIGN PATENT DOCUMENTS

WO 2011002449 1/2011

OTHER PUBLICATIONS

Rosenfeld et al., "Sequential Operations in Digital Picture Processing", Oct. 1966, Journal of the Association for Computing Machinery, vol. 13, No. 4, p. 471-494.*

(Continued)

*Primary Examiner* — Stephen R Koziol
*Assistant Examiner* — Timothy Choi
(74) *Attorney, Agent, or Firm* — Cooper Legal Group, LLC

(57) ABSTRACT

Representations of an object (110) in an image generated by an imaging apparatus (100) can comprise two or more separate sub-objects, producing a compound object (500). Compound objects can negatively affect the quality of object visualization and threat identification performance. As provided herein, a compound object (500) can be separated into sub-objects. Three-dimensional image data of a potential compound object (500) is projected into a two-dimensional manifold projection (504), and segmentation is performed on the two-dimensional manifold projection of the compound object to identify sub-objects. Once sub-objects are identified, the two-dimensional, segmented manifold projection (900) is projected into three-dimensional space (1104). A three-dimensional segmentation may then be performed to identify additional sub-objects of the compound object that were not identified by the two-dimensional segmentation.

20 Claims, 6 Drawing Sheets

(51) Int. Cl.
   *G01V 5/00* (2006.01)
   *G06K 9/34* (2006.01)

(52) U.S. Cl.
   CPC .......... *G01V 5/0016* (2013.01); *G01V 5/0041* (2013.01); *G06K 9/34* (2013.01); *G06K 9/342* (2013.01); *G06T 7/0079* (2013.01)

(56) References Cited

U.S. PATENT DOCUMENTS

| | | | |
|---|---|---|---|
| 6,067,366 A * | 5/2000 | Simanovsky et al. | 382/100 |
| 6,078,642 A | 6/2000 | Simanovsky et al. | |
| 6,128,365 A | 10/2000 | Bechwati et al. | |
| 6,345,113 B1 | 2/2002 | Crawford et al. | |
| 7,031,430 B2 | 4/2006 | Kaucic, Jr. et al. | |
| 2007/0014471 A1 | 1/2007 | Simanovsky et al. | |

OTHER PUBLICATIONS

Levkovich-Maslyuk et al., "Depth Image-Based Representation and Compression for Static and Animated 3-D Objects", Jul. 2004, IEEE Transactions on Circuits and Systems for Video Technology, vol. 14, No. 7, p. 1032-1045.*
Ma et al., "Automatic Video Object Segmentation Using Depth Information and an Active Contour Model", Oct. 2008, IEEE 10th Workshop on Multimedia Signal Processing 2008, p. 910-914.*
International Search Report cited in related application No. PCT/US2011/029315 dated Nov. 29, 2011.
Ying; et al., "Dual Energy Volumetric X-ray Tomographic Sensor for Luggage Screening", Proceedings of the 2007 IEEE Sensors Applications Symposium, IEEE-Piscataway, NJ, USA, Published Feb. 1, 2007.
International Search Report cited in related application No. PCT/US2009/049236 dated Jun. 15, 2010.

* cited by examiner

COMPOUND OBJECT SEPARATION

BACKGROUND

The present application relates to the field of x-ray and computed tomography (CT). It finds particular application with CT security scanners. It also relates to medical, security, and other applications where identifying sub-objects of a compound object would be useful.

Security at airports and in other travel related areas is an important issue given today's sociopolitical climate, as well as other considerations. One technique used to promote travel safety is baggage inspection. Often, an imaging apparatus is utilized to facilitate baggage screening. For example, a CT device may be used to provide security personnel with two and/or three dimensional views of objects. After viewing images provided by the imaging apparatus, security personnel may make a decision as to whether the baggage is safe to pass through the security check-point or if further (hands-on) inspection is warranted.

Current screening techniques and systems can utilize automated object recognition in images from an imaging apparatus, for example, when screening for potential threat objects inside luggage. These systems can extract an object from an image, and compute properties of these extracted objects. Properties of scanned objects can be used for discriminating an object by comparing the objects properties (e.g., density, shape, etc.) with known properties of threat items, non-threat items, or both classes of items. It can be appreciated that an ability to discriminate potential threats may be reduced if an extracted object comprises multiple distinct physical objects. Such an extracted object is referred to as a compound object.

A compound object can be made up of two or more distinct items. For example, if two items are lying side by side and/or touching each other, a security scanner system may extract the two items as one single compound object. Because the compound object actually comprises two separate objects, however, properties of the compound object may not be able to be effectively compared with those of known threat and/or non-threat items. As such, for example, luggage containing a compound object may unnecessarily be flagged for additional (hands-on) inspection because the properties of the compound object resemble properties of a known threat object. This can, among other things, reduce the throughput at a security checkpoint. Alternatively, a compound object that should be inspected further may not be so identified because properties of a potential threat object in the compound object are "contaminated" or combined with properties of one or more other (non-threat) objects in the compound object, and these "contaminated" properties (of the compound object) might more closely resemble those of a non-threat object than those of a threat object, or vice versa.

Compound object splitting can be applied to objects in an attempt to improve threat item detection, and thereby increase the throughput and effectiveness at a security check-point. Compound object splitting essentially identifies potential compound objects and splits them into sub-objects. Compound object splitting involving components with different densities may be performed using a histogram-based compound object splitting algorithm. Other techniques include using surface volume erosion to split objects. However, using erosion as a stand-alone technique to split compound objects can lead to undesirable effects. For example, erosion can reduce a mass of an object, and indiscriminately split objects that are not compound, and/or fail to split some compound objects. Additionally, in these techniques, erosion and splitting may be applied universally, without regard to whether an object is a potential compound object at all.

SUMMARY

Aspects of the present application address the above matters, and others. According to one aspect, a method for splitting a potential three-dimensional compound objects is provided. The method comprises projecting three-dimensional image data indicative of a potential three-dimensional compound object under examination onto a two-dimensional manifold projection and recording a correspondence between the three-dimensional image data (e.g., voxel data) and the 2D manifold projection (e.g., pixel data). The method also comprises segmenting the two-dimensional manifold projection to generate a two-dimensional segmented manifold projection indicative of one or more sub-objects. The method further comprises projecting the two-dimensional segmented manifold projection into three-dimensional image data indicative of the sub-objects utilizing the correspondence between the three-dimensional image data and the two-dimensional manifold projection.

According to another aspect, an apparatus is provided. The apparatus comprises a projector configured to project three-dimensional image data indicative of a potential compound object into a two-dimensional manifold projection indicative of the potential compound object. The apparatus also comprises a two-dimensional segmentation component configured to segment the two-dimensional manifold projection to generate a two-dimensional segmented projection indicative of one or more sub-objects of the potential compound object. The apparatus also comprises a back-projector configured to project the two-dimensional segmented projection into three-dimensional image data indicative of the sub-objects.

According to another aspect, a method is provided. The method comprises projecting three-dimensional image data indicative of a potential compound object under examination into a two-dimensional manifold projection of the potential compound object and recording a correspondence between the three-dimensional image data and the two-dimensional manifold projection. The method also comprises eroding the two-dimensional manifold projection using an adaptive erosion technique and segmenting the two-dimensional manifold projection to generate a two-dimensional segmented projection indicative of one or more sub-objects. The method further comprises pruning pixels indicative of sub-objects of the two-dimensional segmented projection that do not meet predetermined criteria and projecting the two-dimensional segmented projection into three-dimensional image data indicative of the corresponding one or more sub-objects utilizing the correspondence between the three-dimensional image data and the two-dimensional manifold projection.

Those of ordinary skill in the art will appreciate still other aspects of the present invention upon reading and understanding the appended description.

DETAILED DESCRIPTION

Figure 1:
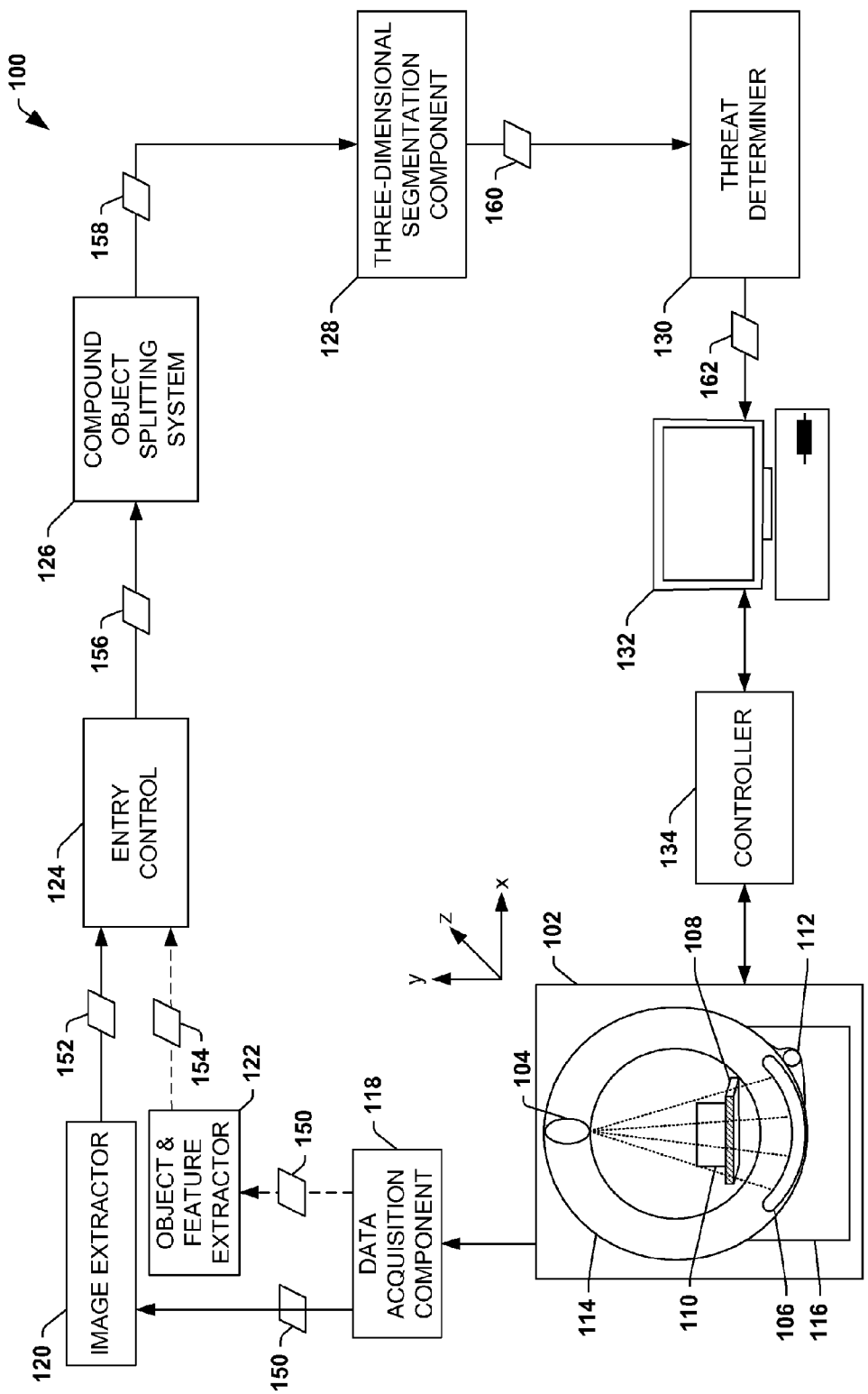
FIG. 1 is a schematic block diagram illustrating an example scanner.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Systems and techniques for separating a compound object representation into sub-objects in an image generated by subjecting one or more objects to imaging using an imaging apparatus (e.g., a computed tomography (CT) image of a piece of luggage under inspection at a security station at an airport) are provided herein. That is, in one embodiment, techniques and systems for splitting compound objects into distinct sub-objects is provided.

FIG. 1 is an illustration of an example environment 100 in which a system may be employed for identifying potential threat containing objects, from a class of objects, inside a container that has been subjected to imaging using an imaging apparatus (e.g., a CT scanner). In the example environment 100 the imaging apparatus comprises an object scanning apparatus 102, such as a security scanning apparatus (e.g., used to scan luggage at an airport). The scanning apparatus 102 may be used to scan one or more objects 110 (e.g., a series of suitcases at the airport). The scanning apparatus typically comprises a rotating gantry portion 114 and a stationary gantry portion 116.

The rotating gantry portion 114 comprises a radiation source 104 (e.g., an X-ray tube), an array of radiation detectors 106 (e.g., X-ray detectors), and a rotator 112 (e.g., a gantry motor) for rotating the rotating gantry portion 114 (i.e., including the radiation source 104 and detectors 106) around the object(s) being scanned 110. An examination surface 108 (e.g., a conveyor belt) passes through a hole in the rotating gantry portion 114 and may be configured to convey the object(s) 110 from an upstream portion of the object scanning apparatus 102 to a downstream portion.

As an example, a computer tomography (CT) security scanner 102 that includes an X-ray source 104, such as an X-ray tube, can generate a fan, cone, wedge, or other shaped beam of X-ray radiation that traverses one or more objects 110, such as suitcases, in an examination region. In this example, the X-rays are emitted by the source 104, traverse the examination region that contains the object(s) 110 to be scanned, and are detected by an X-ray detector 106 across from the X-ray source 104. Further, a rotator 112, such as a gantry motor drive attached to the scanner, can be used to rotate the X-ray source 104 and detector 106 around the object(s) 110, for example. In this way, X-ray projections from a variety of perspectives of the suitcase can be collected, for example, creating a set of X-ray projections for the object(s). While illustrated with the x-ray source 104 and detector 106 rotating around an object, in another example, the radiation source 104 and detector 106 may remain stationary while the object 110 is rotated.

In the example environment 100, a data acquisition component 118 is operably coupled to the scanning apparatus 102, and is typically configured to collect information and data from the detector 106, and may be used to compile the collected data into projection space data 150 for an object 110. As an example, X-ray projections may be acquired at each of a plurality of angular positions with respect to the object 110. Further, as the object(s) 110 is conveyed from an upstream portion of the object scanning apparatus 102 to a downstream portion (e.g., conveying objects parallel to the rotational axis of the scanning array (into and out of the page)), the plurality of angular position X-ray projections may be acquired at a plurality of points along the axis of rotation with respect to the object(s) 110. In one embodiment, the plurality of angular positions may comprise an X and Y axis with respect to the object(s) being scanned, while the rotational axis may comprise a Z axis with respect to the object(s) being scanned.

In the example environment 100, an image extractor 120 is coupled to the data acquisition component 118, and is configured to receive the data 150 from the data acquisition component 118 and generate three-dimensional image data 152 indicative of the scanned object 110 using a suitable analytical, iterative, and/or other reconstruction technique (e.g., backprojecting from projection space to image space).

In one embodiment, the three-dimensional image data 152 for a suitcase, for example, may ultimately be displayed on a monitor of a terminal 132 (e.g., desktop or laptop computer) for human observation. In this embodiment, an operator may isolate and manipulate the image, for example, rotating and viewing the suitcase from a variety of angles, zoom levels, and positions.

It will be appreciated that, while the example environment 100 utilizes the image extractor 120 to extract three-dimensional image data from the data 150 generated by the data acquisition component 118, for example, for a suitcase being scanned, the techniques and systems, described herein, are not limited to this embodiment. In another embodiment, for example, three-dimensional image data may be generated by an imaging apparatus that is not coupled to the system. In this example, the three-dimensional image data may be stored onto an electronic storage device (e.g., a CD-ROM, hard-drive, flash memory) and delivered to the system electronically.

In the example environment 100, in one embodiment, an object and feature extractor 122 may receive the data 150 from the data acquisition component 118, for example, in order to extract objects and features 154 from the scanned items(s) 110 (e.g., a carry-on luggage containing items). It will be appreciated that the systems, described herein, are not limited to having an object and feature extractor 122 at a location in the example environment 100. For example, the object and feature extractor 122 may be a component of the image extractor 120, whereby three-dimensional image data 152 and object features 154 are both sent from the image extractor 120. In another example, the object and feature extractor 122 may be disposed after the image extractor 120 and may extract object features 154 from the three-dimensional image data 152. Those skilled in the art may devise alternative arrangements for supplying three-dimensional image data 152 and object features 154 to the example system.

In the example environment 100, an entry control 124 may receive three-dimensional image data 152 and object features 154 for the one or more scanned objects 110. The entry control 124 can be configured to identify a potential compound object in the three-dimensional image data 152 based on an object's features. In one embodiment, the entry control 124 can be utilized to select objects that may be compound objects 156 for processing by compound object splitting system 126. In one example, object features 154 (e.g., properties of an object in an image, such as an Eigen-box fill ratio) can be computed prior to the entry control 124 and compared with pre-determined features for compound objects (e.g., features extracted from known compound objects during training of a system) to determine whether the one or more objects are compound objects. In another example, the entry control 124 calculates the density of a potential compound object and a standard deviation of the density. If the standard deviation is outside a predetermined range, the entry control 124 may identify the object as a potential compound object. Objects that are not determined to be potential compound objects by the entry control 124 may not be sent through the compound object splitting system 126.

In the example environment 100, the compound object splitting system 126 receives three-dimensional image data indicative of a potential compound object 156 from the entry control 124. The compound object splitting system 126 can be configured to generate sub-objects from the potential compound object by projecting the three-dimensional image data onto a two-dimensional manifold projection (i.e., modeled on Euclidean space, for example) and recording a correspondence between the three-dimensional image data (e.g., voxel data) and the two-dimensional manifold projection (e.g., pixel data). Once projected, one or more pixels indicative of the compound object in the two-dimensional manifold projection are eroded. Pixels that are not eroded may be segmented to generate a two-dimensional segmented projection indicative of one or more sub-objects of the potential compound object 156. It will be appreciated that where the potential compound object 156 is actually a single object (and not a plurality of objects), the two-dimensional segmented projection may be indicative of a sub-object that substantially resembles the potential compound object 156. The two-dimensional segmented projection may then be projected from two-dimensional manifold projection space to three-dimensional image data indicative of the sub-objects 158 utilizing the correspondence between the three-dimensional image data and the two-dimensional manifold data.

In the example environment 100, a three-dimensional segmentation component 128 may be configured to receive the three-dimensional image data indicative of the sub-objects 158 and segment the three-dimensional image data indicative of the sub-object 158 to identify secondary sub-objects. The three-dimensional segmentation component 128 may also be configured to generate three-dimensional image data 160 indicative of the identified secondary sub-objects and/or the sub-objects (e.g., identified by the compound object splitting system 126). It will be appreciated that if no secondary sub-objects are identified, the three-dimensional image data 169 output by the three-dimensional segmentation component 128 may be indicative of the sub-objects.

In the example environment 100, a threat determiner 130 can receive image data for an object, which may comprise image data indicative of sub-objects and/or image data indicative of secondary sub-objects. The threat determiner 130 can be configured to compare the image data to one or more pre-determined thresholds, corresponding to one or more potential threat objects. It will be appreciated that the systems and techniques provided herein are not limited to utilizing a threat determiner, and may be utilized for separating compound objects without a threat determiner. For example, image data for an object may be sent to a terminal 132 wherein an image of the object under examination 110 may be displayed for human observation.

Information concerning whether a scanned object is potentially threat containing and/or information concerning sub-objects 162 can be sent to a terminal 132 in the example environment 100, for example, comprising a display that can be viewed by security personal at a luggage screening checkpoint. In this way, in this example, real-time information can be retrieved for objects subjected to scanning by a security scanner 102.

In the example environment 100, a controller 134 is operably coupled to the terminal 132. The controller 134 receives commands from the terminal 132 and generates instructions for the object scanning apparatus 102 indicative of operations to be performed. For example, a human operator may want to rescan the object 110 and the controller 134 may issue an instruction instructing the examination surface 108 to reverse direction (e.g., bringing the object back into an examination region of the object scanning apparatus 102).

Figure 2:
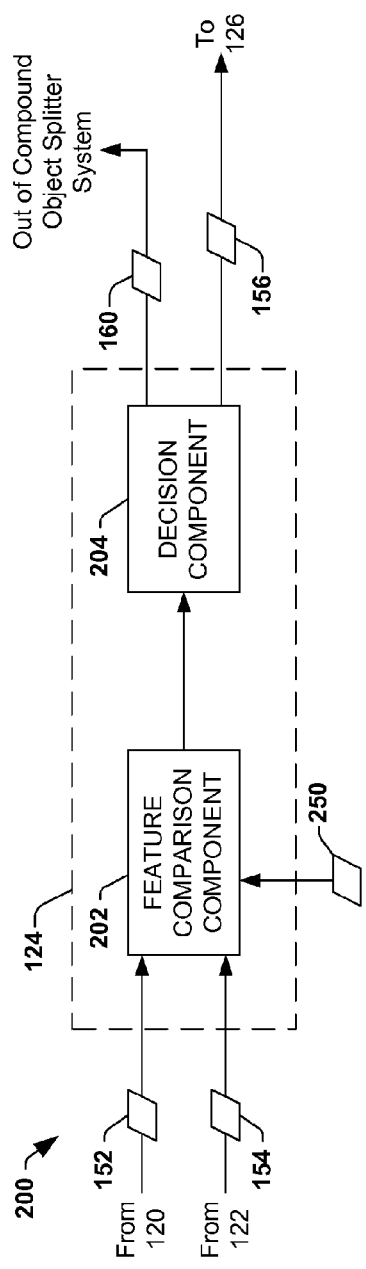
FIG. 2 is a component block diagram illustrating one or more components of an environment wherein compound object splitting of objects in an image may be implemented as provided herein.

FIG. 2 is a component block diagram illustrating one embodiment 200 of an entry control 124, which can be configured to identify a potential compound object based on an object's features. The entry control 124 can comprise a feature threshold comparison component 202, which can be configured to compare the respective one or more feature values 154 to a corresponding feature threshold 250.

In one embodiment, image data 152 for an object in question can be sent to the entry control 124, along with one or more corresponding feature values 154. In this embodiment, feature values 154 can include, but not be limited to, an object's shape properties, such as an Eigen-box fill ratio (EBFR) for the object in question. As an example, objects having a large EBFR typically comprise a more uniform shape; while objects having a small EBFR typically demonstrate irregularities in shape. In this embodiment, the feature threshold comparison component 202 can compare one or more object feature values with a threshold value for that object feature, to determine which of the one or more features indicate a compound object for the object in question. In another embodiment, the feature values 154 can include properties related to the average density of the object and/or the standard deviation of densities of portions of the object. The feature threshold comparison component 202 may compare the standard deviation of the densities to a threshold value to determine whether a compound object may be present.

In the example embodiment 200, the entry control 124 can comprise an entry decision component 204, which can be configured to identify a potential compound object based on results from the feature threshold comparison component 202. In one embodiment, the decision component 204 may identify a potential compound object based on a desired number of positive results for respective object features, the positive results comprising an indication of a potential compound object. As an example, in this embodiment, a desired number of positive results may be one hundred percent, which means that if one of the object features indicates a non-compound object, the object may not be sent to be separated 160. However, in this example, if the object in question has the desired number of positive results (e.g., all of them) then the image data for the potential compound object can be sent for separation 156. In another example, the entry decision component 204 may identify a potential compound object when the standard deviation exceeds a predefined threshold at the threshold comparison component 202.

Figure 3:
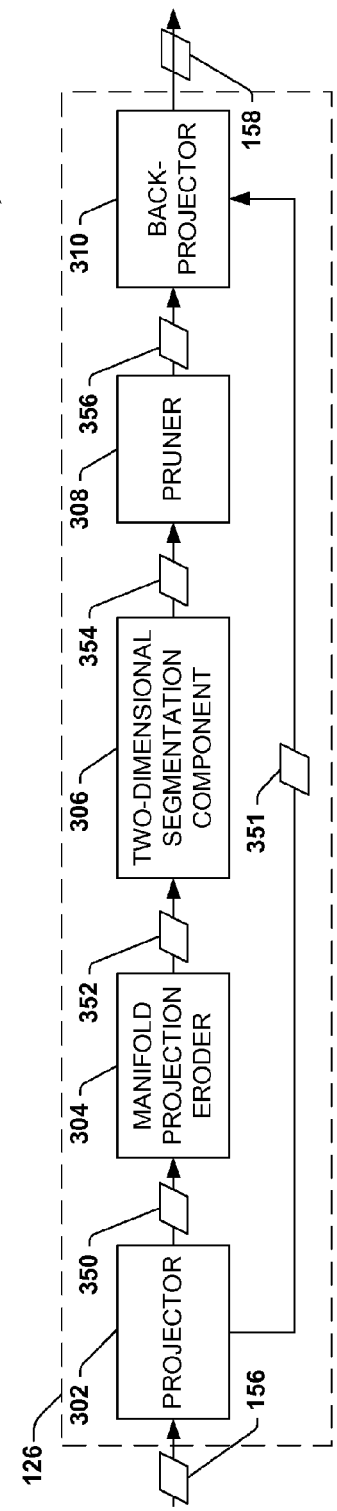
FIG. 3 is a component block diagram illustrating details of one or more components of an environment wherein compound object splitting of objects in an image may be implemented as provided herein.

FIG. 3 is a component block diagram of one example embodiment 300 of a compound object splitting system 126, which can be configured to generate three-dimensional image data 158 indicative of sub-objects from three-dimension image data 156 indicative of a potential compound object.

The example embodiment of the compound object splitter system 126 comprises a projector 302 configured to receive the three-dimensional image data 156 indicative of the potential compound object. The projector is also configured to convert that three-dimensional image data 156 indicative of the potential compound object into a two-dimensional manifold projection 350 indicative of the potential compound object and record a correspondence 351 between the three-dimensional image data and the two-dimensional manifold projection. That is, one or more voxels of the three-dimensional image data are recorded as being represented by, or associated with, a pixel of the two-dimensional manifold projection 350 indicative of the potential compound object. Such a recording may be beneficial during back-projection from two-dimensional manifold projection space to three-dimensional image space so that properties of the voxels (e.g., densities of the voxels, atomic numbers identified by the voxels, etc.) are not lost during the projection and back-projection, for example. It will be appreciated that while the projector 302 records the correspondence 351 in this embodiment, in other embodiments, another component of the object splitter system 126 and/or the other components of the example environment 100 may record the correspondence 351.

It will be understood to those skilled in the art that a manifold is a two-dimensional representation of a three-dimensional function. For example, a two-dimensional atlas of a portion of a globe may be considered a two-dimensional manifold projection. While a point on the two-dimensional atlas may not correspond perfectly with a corresponding point on a three-dimensional globe when viewed in the context of neighboring points (e.g., because of the lack of a z-dimension, for example), when viewed individually, or locally (e.g., not in context with neighboring points), the point is a substantially perfect representation of the corresponding point on the three-dimensional globe.

In one example, the two-dimensional manifold projection 350 is mapped to Euclidean space. In this way, the manifold's dimension is a topological invariant, and thus the two-dimensional manifold projection 350 maintains topological properties of a given space in the three-dimensional image data 156.

A pixel in the two-dimensional manifold projection 350 represents one or more voxels of the three-dimensional image data 156. The number of voxels that are represented by a given voxel may depend upon the number of object voxels that are "stacked" in a dimension of the three-dimensional image data 156 that is not included in the two-dimensional manifold projection 350. For example, if at a given x and z coordinate, three voxels are stacked in y-dimension of the three-dimensional image data 156, a pixel corresponding to the given x and z coordinate may represent three voxels in the two-dimensional manifold projection 350. Similarly, a pixel adjacent to the pixel may represent five voxels if at a second x and z coordinate, five voxels are stacked in the y-dimension (e.g., the compound object has a larger y-dimension at the x, z coordinates of the adjacent pixel than it does at the pixel). The number of voxels represented by a pixel may be referred to as a "pixel value".

In the example embodiment 300, the compound object splitter system 126 further comprises a manifold projection eroder 304 which is configured to receive the two-dimensional manifold projection 350. The manifold projection eroder 304 is also configured to erode the two-dimensional manifold projection 350, and thus reveal one or more sub-objects of the potential compound object. In one example, the manifold projection eroder 304 uses an adaptive erosion technique to erode one or more pixels of the two-dimensional manifold projection 350, and the sub-objects are revealed based upon spaces, or gaps, within the compound object. It will be appreciated that an "adaptive erosion technique" as used herein refers to a technique that adjusts criteria, or thresholds, for determining which pixels to erode as a function of characteristics of one or more (neighboring) pixels. That is, the threshold is not constant, but rather changes according to the properties, or characteristics of the pixels.

In one example of an adaptive erosion technique, the manifold projection eroder 304 determines whether to erode a first pixel by comparing pixels values for pixels neighboring the first pixel to determine an erosion threshold for the first pixel. Once the erosion threshold for the first pixel is determined, the threshold is compared to respective pixel values of the neighboring pixels. If a predetermined number of respective pixel values are below the threshold, the first pixel is eroded (e.g., a value of the pixel is set to zero or some value not indicative of an object). The manifold projection eroder 304 may repeat a similar adaptive erosion technique on a plurality of pixels to identify spaces, or divides, in the compound object. In this way, one or more portions of the compound object may be divided to reveal one or more sub-objects (e.g., each "group" of pixels corresponding to a sub-object). It will be appreciated that other adaptive techniques and/or static techniques (e.g., where the threshold remains constant during the erosion of a plurality of pixels) known to those skilled in the art are also contemplated.

The compound object splitting system 126 further comprises a two-dimensional segmentation component 306 configured to receive the eroded manifold projection 352 from the manifold projection eroder 304 and to segment the two-dimensional manifold projection to generate a two-dimensional, segmented, manifold projection 354. As an example, segmentation may include binning the pixels into bins corresponding to a respective sub-object and/or labeling pixels associated with identified sub-objects. For example, before erosion, the pixels may have been labeled with number "1", indicative of (compound) object "1". However, after erosion, one or more sub-objects of the (compound) object "1" may be identified and a first group of pixels may be labeled according to a value (e.g., "1") assigned to a first identified sub-object, a second group of pixels may be labeled according to a value (e.g., "2") assigned to a second identified sub-object, etc. In this way, respective sub-objects may be identified as distinct objects in the image, rather than a single compound object.

In the example embodiment 300, the compound object splitter system 126 further comprises a pruner 308 that is configured to receive the two-dimensional, segmented, manifold projection 354. The pruner is also configured to prune pixels of the two-dimensional segmented manifold projection 354 that are indicative of sub-objects that do not meet predetermined criteria (e.g., the sub-object is represented by too few pixels to be considered a threat, the mass of the sub-object is not great enough to be a threat, etc.). In one embodiment, pruning comprises relabeling pixels indicative of the sub-objects that do not meet predetermined criteria as background (e.g., labeling the pixels as "0"), or otherwise discarding the pixels. As an example, a sub-object that is represented by three pixels may be immaterial to achieving the purpose of the examination (i.e., threat detection), and the pruner may discard the sub-object by altering the pixels.

The compound object splitting system 126 further comprises a back-projector 310 configured to receive the pruned and segmented manifold projection 356 and to project the two-dimensional manifold projection 356 into three-dimensional image data indicative of the sub-objects 158. That is, the back-projector 310 is configured to reverse map the data from two-dimensional manifold space into three-dimensional image space utilizing the correspondence 351 between the three-dimensional image data and the two dimensional manifold projection. In this way, voxels of the three-dimensional data indicative of the potential compound object 156 may be relabeled according to the labels assigned to corresponding pixels in the two-dimensional manifold projection 356 to generate the three-dimensional image data indicative of the sub-objects 158. For example, voxels originally labeled as indicative of compound object "1" may be relabeled; a portion of the voxels relabeled as indicative of sub-object "1" and a portion of the voxels relabeled as indicative of sub-object "2." It will be appreciated that by relabeling the voxels of the three-dimensional data indicative of the potential compound object 156, properties of the voxels (and therefore of the object) may be retained. Stated differently, by using such a technique, the properties of the object may not be lost during the projection into manifold projection space and the projection from manifold projection space into three-dimensional image space.

It will appreciated that in one embodiment, the three-dimensional image data indicative of the sub-objects 158 is segmented by a three-dimensional segmentation component (e.g., 128 in FIG. 1) that further refines that object, or rather detects secondary sub-objects that were not identified by the compound object splitting system 126 to generate three-dimensional data indicative of one or more secondary sub-objects. For example, where two objects substantially overlap in the y-dimension and are connected to a third object, the compound object splitting system 126 may not recognize the substantially overlapping objects if the manifold projection depicts that x and z dimensions. Therefore, the compound object splitting system 126 may separate the three objects of the compound object into two sub-objects. A first sub-object may comprise the two substantially overlapping objects and the second sub-object may comprise the third sub-object. The three-dimensional segmentation component 128 may recognize a gap in the y-dimension between the two sub-objects and separate the first sub-object into two secondary sub-objects, for example. Thus, the compound object splitting system 126 splits the compound object into two objects and the three-dimensional segmentation component 128 splits the two objects into three objects. It will be appreciated a three-dimensional segmentation component 128 placed before the compound object splitting system 126 may not recognize the two substantially overlapping objects as two objects because both were connected to the third object, and therefore the three-dimensional segmentation component 128 would not have identified the gap in the y-dimension between the two overlapping objects.

The three-dimensional image data indicative of the sub-objects 158 and/or three-dimensional data indicative of the secondary sub-objects (e.g., 160 in FIG. 1) may be displayed on a monitor of a terminal (e.g., 132 in FIG. 1) and/or transmitted to a threat determiner (e.g., 130) that is configured to identify threats according to the properties of an object. Because the compound object has been divided into sub-objects, the threat determiner may better discern the characteristics of an object and thus may more accurately detect threats, for example.

A method may be devised for separating a compound object into sub-objects in an image generated by an imaging apparatus. In one embodiment, the method may be used by a threat determination system in a security checkpoint that screens passenger luggage for potential threat items. In this embodiment, an ability of a threat determination system to detect potential threats may be reduced if compound objects are introduced, as computed properties of the compound object may not be specific to a single physical object. Therefore, one may wish to separate the compound object into distinct sub-objects of which it is comprised.

Figure 4:
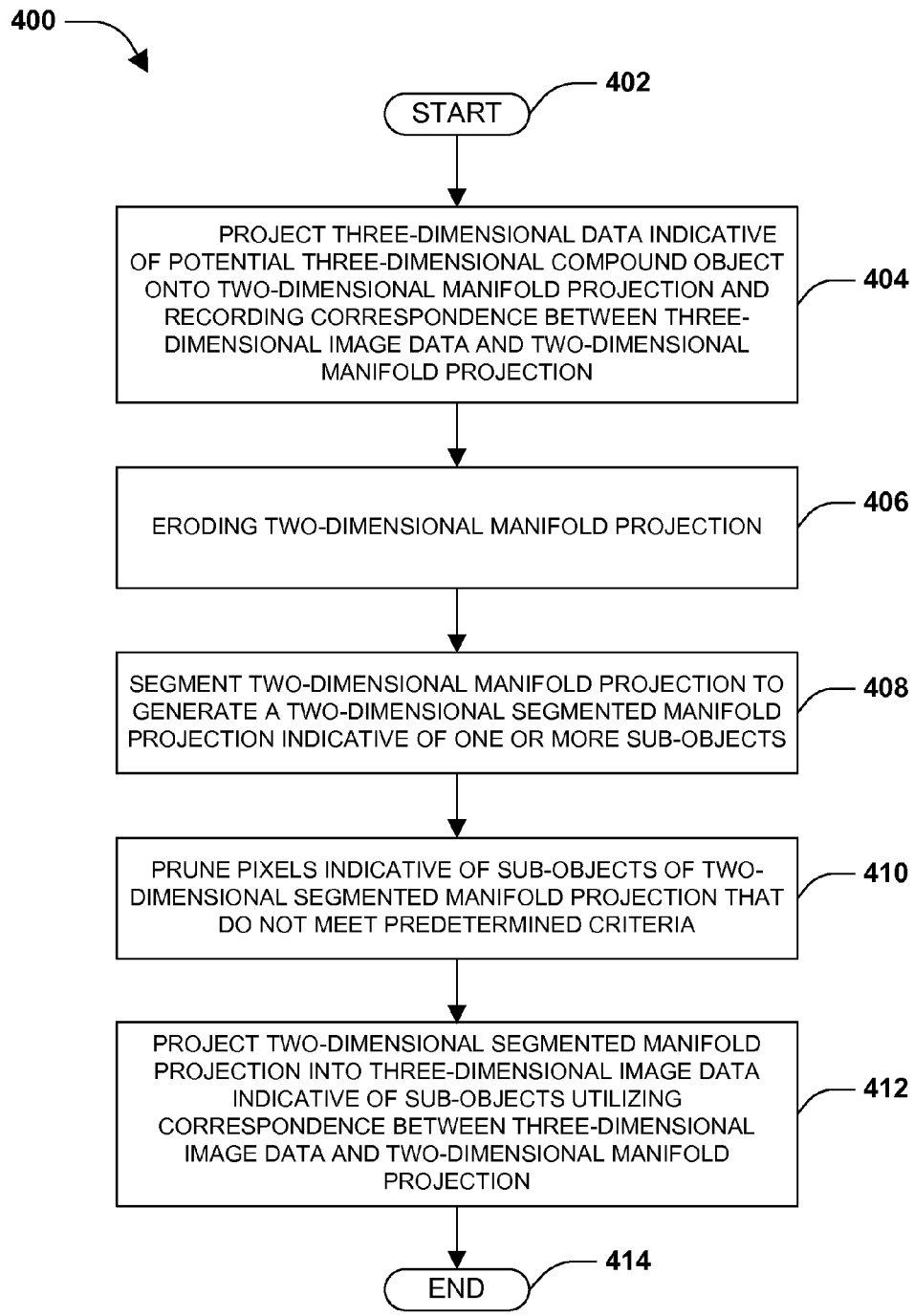
FIG. 4 is a flow chart diagram of an example method for compound object splitting.

FIG. 4 is a flow chart diagram of an example method 400. Such an example method 400 may be useful for splitting a potential three-dimensional compound object, for example. The method begins at 402 and involves projecting three-dimensional image data indicative of a potential compound object under examination onto a two-dimensional manifold projection of the potential compound object and a correspondence between the three-dimensional image data and the two-dimensional manifold projection is recorded at 404. That is, the image data is mapped from three-dimensional image space to two-dimensional manifold projection space and voxel data one or more voxels of the image space are recorded as being associated with a pixel of the two-dimensional manifold projection. In one embodiment, the two-dimensional manifold projection space is Euclidean space.

It will be appreciated that before the three-dimensional image data is projected into two-dimensional manifold projection space, it may be useful to first identify whether an object is likely to be a potential compound object. In this way, the acts herein described may not be performed unless it is probably that an identified object is a compound object. In one example, the probability that an object is a potential compound object is determined by calculating the average density and/or atomic number (i.e., if the scanner is a dual energy scanner) and a standard deviation. If the standard deviation is above a predefined threshold, the object may be considered a potential compound object and thus the acts herein described may be performed to split the potential compound object into one or more sub-objects.

Figure 5:
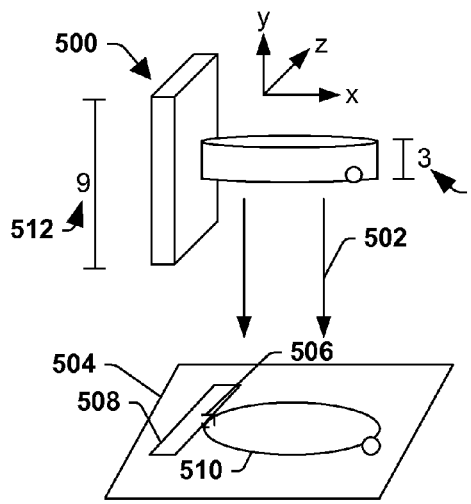
FIG. 5 is a graphical representation of three-dimensional image data of a compound object being converted onto a two-dimensional manifold projection.

FIG. 5 is a graphical representation of three-dimensional image data of a compound object 500 being projected 502 onto a two-dimensional manifold projection 504. As illustrated, the three-dimensional object 500 is collapsed into a two-dimensional plane that retains two dimensions (e.g., an x-dimension and a z-dimension) of the three-dimensional object 500 (e.g., the y-dimension is lost during the projection).

Because a dimension is lost when projecting from three-dimensional space to two-dimensional space, pixels of the two-dimensional manifold projection are assigned a value (herein referred to as a "pixel value") based upon the number of voxels represented by the pixel. For example, if a y-dimension of the image data is lost during the projection, the pixel is assigned a value corresponding to the number of voxels in the y-dimension that the pixel represents.

Figure 6:
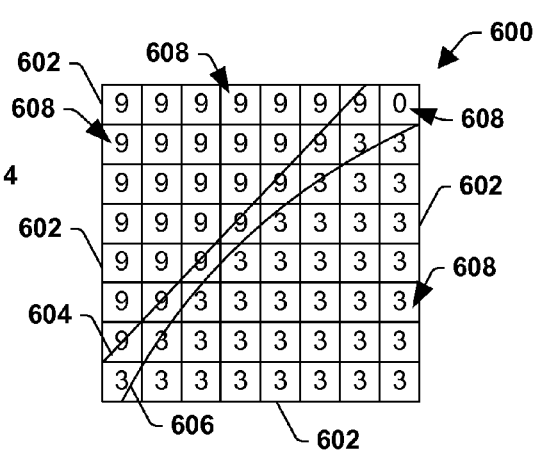
FIG. 6 illustrates a portion of a two-dimensional manifold projection.

FIG. 6 illustrates an enlargement 600 of a portion of two-dimensional manifold projection 506 in FIG. 5. The squares 602 represent pixels in the two-dimensional manifold. Pixels above a diagonal line 604 (e.g., an edge of a rectangular portion 508 of the object 500 in FIG. 5) are representative of the rectangular portion 508. Pixels below an arched line 606 (e.g., an edge of an oval portion 510 of the object 500 in FIG. 5) are representative of the oval portion 510. As illustrated, respective pixels are assigned a pixel value 608 (e.g., a number) corresponding to the number of voxels represented by the pixel. For example, pixels representative of the rectangular portion 508 have a pixel value of nine because the rectangular portion 508 was represented by nine voxels in the y-dimension 512 (at all x and z dimensions of the rectangle 508). Similarly pixels representative of the oval portion 510 have a pixel value of three because the oval portion 510 was represented by three voxels in the y-dimension 514 (at all x and z dimensions of the oval 510). It will be appreciated that pixels that are representative of both of the oval portion 510 and the rectangular portion 508 (e.g., pixels that are situated between the diagonal line 604 and the arched line 606) may be assigned a pixel value corresponding to the portion of the object represented by a larger number of voxels (e.g., the rectangle 508).

Returning to FIG. 4, at 406 the two-dimensional manifold projection is eroded. That is, connections between two or more objects are removed so that the objects are defined as a plurality of objects rather than a single, compound object. Typically, eroding involves setting pixels identified with the connection to a value (e.g., zero) indicative of no object, or rather indicative of background.

In one example, an adaptive erosion technique is used to erode the two-dimensional manifold projection. A determination of whether to erode pixels is dynamic (e.g., the erosion characteristics are not constant) and is based upon characteristics of pixels neighboring the pixel being considered for erosion. That is, a threshold for determining whether to erode a pixel or not to erode a pixel is based upon characteristics of neighboring pixels and the same threshold may not be used for each pixel that is being considered for erosion. An adaptive erosion technique may be beneficial over other erosion techniques known to those skilled in the art to preserve portions of the object (e.g., 500 in FIG. 5) that are located towards the interior of the object, or rather sub-objects, and portions of the object that are strongly connected based on probability analysis (using a Markov random field model), for example.

As an example, the adaptive erosion technique used to determine whether to erode a first pixel may comprise comparing pixel values (e.g., 608 in FIG. 6) for pixels neighboring the first pixel to determine an erosion threshold for the first pixel. Once the erosion threshold for the first pixel has been determined, it may be compared to respective pixel values of the neighboring pixels. If a predetermined number of respective pixel values of neighboring pixels are below the erosion threshold, the first pixel may be eroded. These acts may be repeated to determine an erosion threshold for a second pixel and to determine whether to erode the second pixel.

Figure 7:
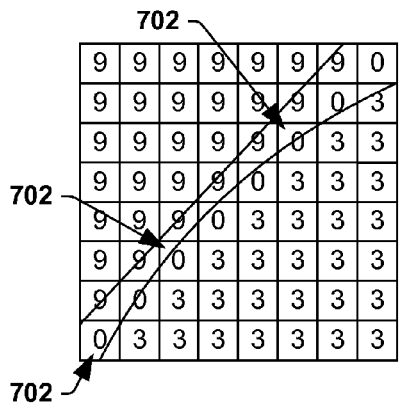
FIG. 7 illustrates a portion of a two-dimensional manifold projection after the projection has been eroded.

FIG. 7 illustrates the enlargement 600 in FIG. 6 after the two-dimensional manifold has been eroded. As illustrated, pixels were eroded if at least four neighboring (e.g., in this case adjacent) pixels did not exceed the erosion threshold for the pixel under consideration for erosion. The eroded pixels (e.g., 702) are represented by a pixel value of zero. The pixels that were not eroded maintained the pixel value that was assigned to them before the two-dimensional manifold projection was eroded.

Figure 8:
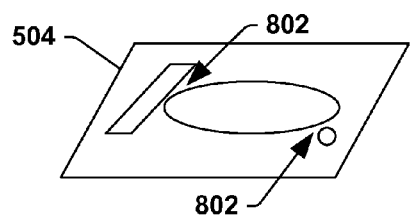
FIG. 8 is a graphical representation of a two-dimensional manifold projection that has been eroded.

FIG. 8 illustrates the two-dimension manifold projection 504 after erosion (e.g., an eroded manifold projection). It will be appreciated that sub-objects of the compound object 500 have been defined and are no longer in contact with one another (e.g., there is space 802 between sub-objects). This may allow a two-dimensional segmentation component (e.g., 306 in FIG. 3) to more easily segment the compound object into sub-objects, for example.

Returning to FIG. 4, at 408 the two-dimensional manifold projection is segmented to generate a two-dimensional, segmented manifold projection indicative of one or more sub-objects. Segmentation generally involves binning (e.g., grouping) pixels representative of a sub-object together and/or labeling pixels to associate the pixels with a particular object. For example, a suitcase may have a plurality of objects (each object identified by a label in the three dimensional image data). One object, identified by label "5" may be considered a potential compound object and thus image data of the potential object may be converted to manifold projection space and each pixel may be identified by the label "5" (e.g., corresponding to the object being examined). After the manifold projection is eroded, two sub-objects may be identified and the pixels may be relabeled (e.g., segmented). A first sub-object may be labeled "5," for example, and a second sub-object may be labeled "6." In this way, two sub-objects may be identified from a single potential compound object.

Figure 9:
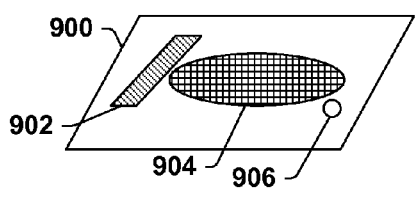
FIG. 9 is a graphical representation of a two-dimensional manifold projection that has been segmented.

FIG. 9 illustrates a two-dimensional segmented, manifold projection 900 indicative of three objects. Pixels indicative of a rectangular sub-object 902 are labeled with a first label, pixels indicative of an oval sub-object 904 are labeled with a second label, and pixels indicative of a circular sub-object 906 are labeled with a third label. Stated different, pixels of the two-dimensional manifold 505 that were originally indicative of a single potential compound object 500 are now indicative of three sub-objects. It will be appreciated that the shading in FIG. 9 is only intended to represent the recognition of sub-objects, rather than a single compound object, and is not intended to represent coloring or shading of the manifold projection 900.

Figure 10:
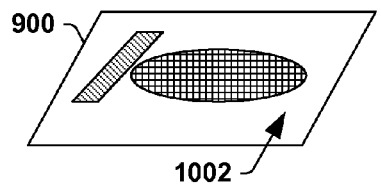
FIG. 10 is a graphical representation of a two-dimensional manifold projection that has been pruned.

At 410 in FIG. 4, pixels indicative of sub-objects of the two-dimensional segmented projection that not meet predetermined criteria are pruned (e.g., the pixels are set to a background value). The predetermined criteria may include a pixel count for the sub-object (e.g., a number of pixels representative of the sub-object), that mass of the sub-object, and/or another criteria that would help determine whether the sub-object is valuable to the examination and therefore should not be pruned. For example, pixels that are indicative of a sub-object that is unlikely to be a threat because of the size of the sub-object may be removed so that time is not consumed backprojecting the pixels into three-dimensional space. In FIG. 10, the circular sub-object 906 of the two-dimensional segmented projection 900 is pruned 1002 because the number of pixels representing the circular sub-object 906 were too few to indicate that the sub-object was a security threat, for example.

At 412 in FIG. 4, the two-dimensional segmented projection is projected into three-dimensional image data indicative of the sub-objects utilizing the correspondence between the three-dimensional image data and the two-dimensional manifold projection. In one example, this includes relabeling voxels of the three-dimensional image data (e.g., 156 in FIG. 1) indicative of the potential compound object according to the labels of corresponding pixels in the two-dimensional, segmented manifold projection. For example, if voxels of the potential compound object were labeled as belonging to object "5" in a suitcase, the voxels may be relabeled so that some of the voxels are indicative of a rectangular object (labeled "5") and some of the voxels are indicative of a circular object (labeled "6"). In this way, data that is determined to be indicative of a compound object it split into a plurality sub-objects.

Figure 11:
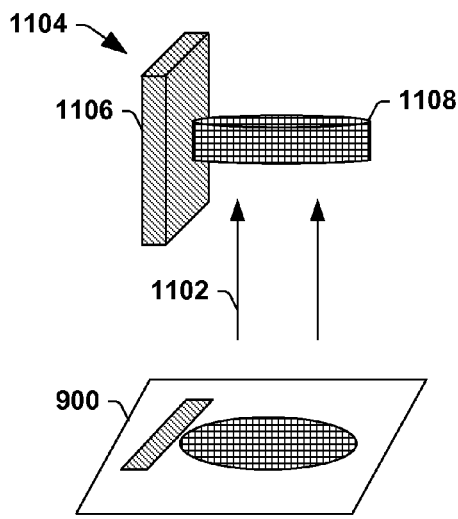
FIG. 11 is a graphical representation of a two-dimensional, segmented manifold projection being projected into three-dimensional space.

FIG. 11 provides a graphical representation of the two-dimensional segmented, manifold projection 900 being projected 1102 into three-dimensional image data indicative of one or more sub-objects 1104. As illustrated by the shading, the rectangular object 1106 is recognized as a first object and the oval object 1108 is recognized as a second object (e.g., the objects are no longer recognized as parts of a compound object 500).

In one embodiment, the three-dimensional image data indicative of the sub-objects may be segmented to further segment the sub-objects and identify one or more secondary sub-objects. A segmentation in three-dimensional image data after the two-dimensional segmentation may be useful to identify an object that substantially overlays a second object in the dimension that was lost when the three-dimensional image was converted to two-dimensional space (e.g., the y-dimension), and thus, could not be segmented in the two-dimensional space.

Figure 12:
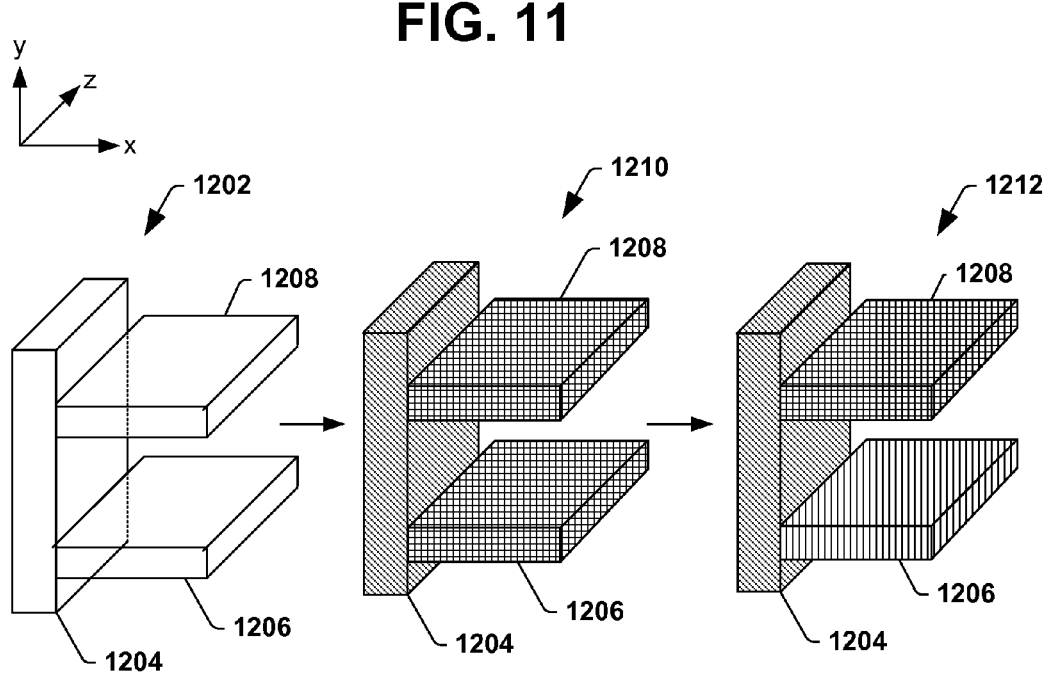
FIG. 12 is a graphical representation of a compound object, a compound object after two-dimensional segmentation, and a compound object after three-dimensional segmentation.

FIG. 12 depicts a series of representations of a three-dimension potential compound object being split through the acts herein describe. The first representation 1202 represents the potential compound object before the image data is converted to manifold projection space and/or two-dimensional segmentation has occurred. As illustrated, a first 1204, a second, 1206, and a third 1208 rectangular object are part of the compound object.

The second representation 1210 represents the compound object after the manifold projection data has been segmented and projected back into three-dimensional image space. As illustrated, during segmentation in the two-dimensional manifold space, the compound object was recognized to be two-sub-objects. The first rectangular object 1204 (e.g., illustrated in a first shading pattern) was recognized as a different object that the second 1206 and third 1208 rectangular objects (e.g., illustrated in a second shading pattern). However, because the second 1206 and third 1208 rectangular objects were "stacked" on top of one another (e.g., the objects lie in the same x and z dimensions), the two-dimensional segmentation could not identify a "gap," or weak connection, between the second 1206 and third 1208 rectangular objects. Therefore, voxels associated with the second rectangular object 1206 and voxels associated with the third rectangular object 1208 were labeled as being as a single sub-object. It will be appreciated that a three-dimensional segmentation prior to the two-dimensional segmentation would also not recognize the second 1206 and third 1208 rectangular objects as separate objects because they were both joined to the first rectangular object 1204.

The third representation 1212 represents the compound object after a three-dimensional segmentation has occurred. Because the first rectangular object 1204 was recognized as a separate sub-object of the compound object during two-dimensional manifold segmentation, a three-dimension segmentation may identify a "gap" between the second 1206 and third 1208 rectangular objects and split the sub-object into two secondary sub-objects (e.g., each object is represented by a different shading pattern). Thus, the single compound object (e.g., represented by the first representation 1202) is split into three objects by performing a two-dimensional segmentation and a three-dimensional segmentation.

Returning to FIG. 4, the method ends at 414.

Figure 13:
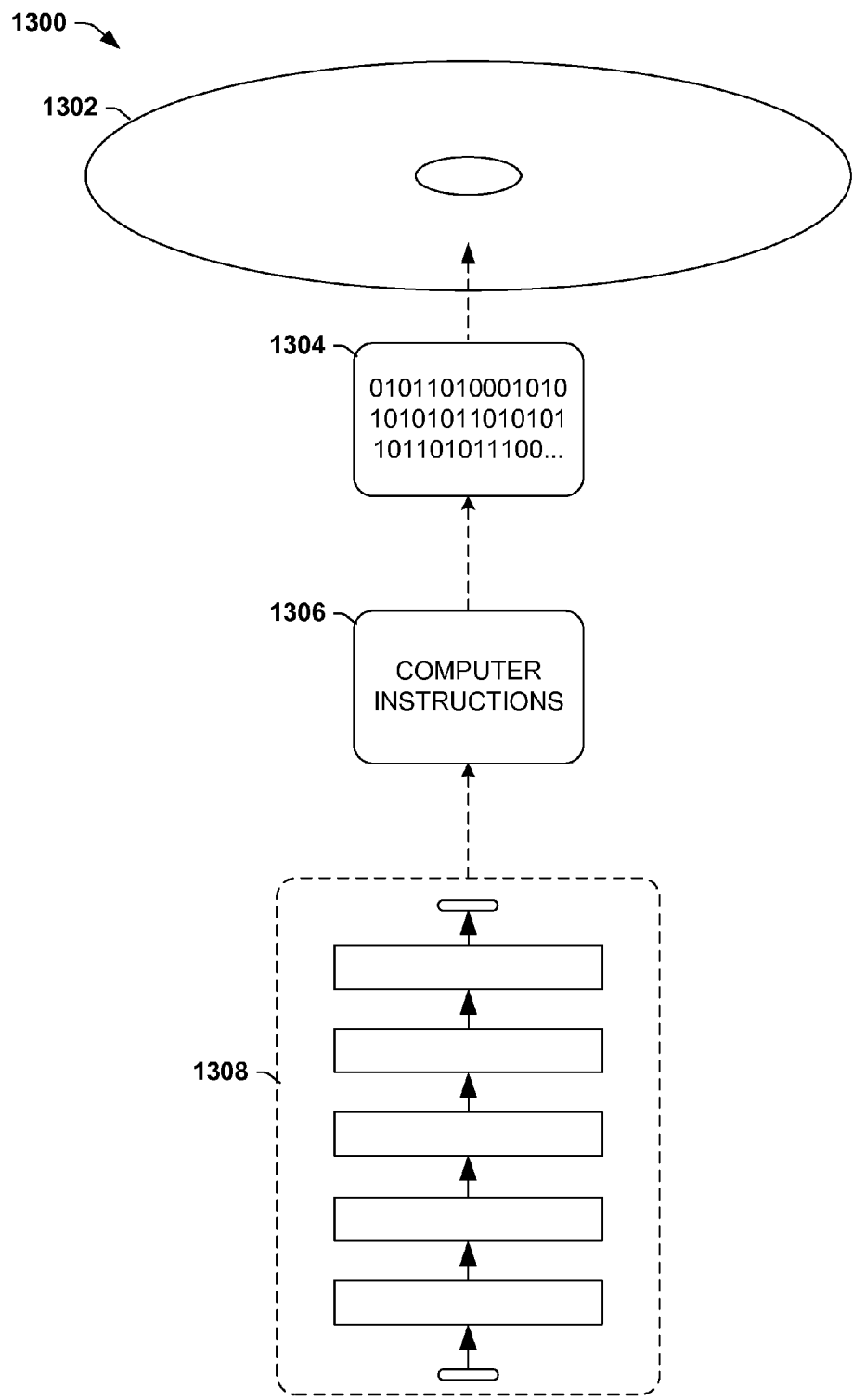
FIG. 13 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 13, wherein the implementation 1300 comprises a computer-readable medium 1302 (e.g., a CD-R, DVD-R, or a platter of a hard disk drive), on which is encoded computer-readable data 1304. This computer-readable data 1304 in turn comprises a set of computer instructions 1306 configured to operate according to one or more of the principles set forth herein. In one such embodiment 1300, the processor-executable instructions 1306 may be configured to perform a method 1308, such as the example method 400 of FIG. 4, for example. In another such embodiment, the processor-executable instructions 1306 may be configured to implement a system, such as at least some of the exemplary scanner 100 of FIG. 1, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for splitting a potential three-dimensional compound object, comprising:
    projecting three-dimensional image data indicative of the potential three-dimensional compound object along a first dimension to generate a two-dimensional manifold projection from the three-dimensional image data and recording a correspondence between the three-dimensional image data and the two-dimensional manifold projection, wherein each pixel in the two-dimensional manifold projection represents a stack of voxels in the three-dimensional image data that extend along the first dimension;
    segmenting the two-dimensional manifold projection to generate a two-dimensional segmented manifold projection indicative of one or more sub-objects, the segmenting comprising eroding a portion of the two-dimensional manifold projection; and
    projecting the two-dimensional segmented manifold projection into three-dimensional image data indicative of the sub-objects utilizing the correspondence between the three-dimensional image data and the two-dimensional manifold projection.

2. The method of claim 1, comprising identifying the potential three-dimensional compound object based on characteristics of the potential three-dimensional compound object.

3. The method of claim 1, wherein segmenting the two-dimensional manifold projection comprises:
    grouping pixels of the two-dimensional manifold projection to generate the two-dimensional segmented manifold projection, wherein a group of pixels is indicative of a sub-object.

4. The method of claim 3, comprising pruning pixels indicative of sub-objects of the two-dimensional segmented manifold projection that do not meet predetermined criteria.

5. The method of claim 4, wherein the predetermined criteria comprises a pixel count threshold.

6. The method of claim 1, wherein eroding a portion of the two-dimensional manifold projection comprises:
    comparing pixel values for pixels neighboring a first pixel to determine an erosion threshold for the first pixel;
    comparing the erosion threshold for the first pixel to respective pixel values of the pixels neighboring the first pixel; and
    eroding the first pixel if a predetermined number of the respective pixel values of the pixels neighboring the first pixel are below the erosion threshold for the first pixel.

7. The method of claim 3, comprising labeling a first group of pixels of the two-dimensional manifold projection with a first label and a second group of pixels of the two-dimensional manifold projection with a second label if there is a second group, the first label different from the second label.

8. The method of claim 1, comprising reconstructing the three-dimensional image data from projection space data.

9. The method of claim 1, wherein a threshold value for determining whether to erode a pixel is dynamic and based upon characteristics of pixels neighboring the pixel.

10. The method of claim 1, wherein segmenting the two-dimensional manifold projection comprises:
    identifying one or more sub-objects using the two-dimensional manifold projection; and
    labeling pixels associated with a first identified sub-object of the two-dimensional manifold projection with a first label and labeling pixels associated with a second identified sub-object of the two-dimensional manifold projection with a second label if a second sub-object is identified.

11. The method of claim 1, comprising segmenting the three-dimensional image data indicative of the sub-objects to identify one or more secondary sub-objects.

12. An apparatus, comprising:
    a processor; and
    memory comprising instructions that when executed at least in part by the processor perform operations, comprising:
        projecting three-dimensional image data of a potential compound object along a first dimension to generate a two-dimensional manifold projection indicative of the potential compound object from the three-dimensional image data, wherein each pixel in the two-dimensional manifold projection represents a stack of voxels in the three-dimensional image data that extend along the first dimension;
        eroding one or more pixels of the two-dimensional manifold projection;
        segmenting, after the eroding, the two-dimensional manifold projection to generate a two-dimensional segmented manifold projection indicative of one or more sub-objects of the potential compound object; and
        projecting the two-dimensional segmented manifold projection into three-dimensional image data indicative of the sub-objects.

13. The apparatus of claim 12, the segmenting comprising labeling a first group of pixels of the two-dimensional manifold projection according to a value assigned to a first identified sub-object and labeling a second group of pixels of the two-dimensional manifold projection according to a value assigned to a second identified sub-object if a second sub-object is identified.

14. The apparatus of claim 12, wherein the eroding comprises using an adaptive erosion technique to erode the one or more pixels of the two-dimensional manifold projection.

15. The apparatus of claim 12, comprising pruning two-dimensional segmented manifold projection, the pruning comprising eroding a set of one or more pixels that do not meet predetermined criteria.

16. The apparatus of claim 12, comprising segmenting the three-dimensional image data indicative of the sub-objects to identify one or more secondary sub-objects.

17. The apparatus of claim 12, the projecting the two-dimensional segmented manifold projection comprising labeling one or more voxels of the three-dimensional image data indicative of the potential compound object according to labels of pixels in the two-dimensional segmented manifold projection that correspond to the voxels.

18. A method, comprising:
projecting three-dimensional image data indicative of a potential compound object under examination along a first dimension to generate a two-dimensional manifold projection of the potential compound object from the three-dimensional image data and recording a correspondence between the three-dimensional image data and the two-dimensional manifold projection, wherein each pixel in the two-dimensional manifold projection represents a stack of voxels in the three-dimensional image data that extend along the first dimension;
eroding the two-dimensional manifold projection using an adaptive erosion technique;
segmenting the two-dimensional manifold projection to generate a two-dimensional segmented manifold projection indicative of one or more sub-objects;
pruning pixels indicative of sub-objects of the two-dimensional segmented manifold projection that do not meet predetermined criteria; and
projecting the two-dimensional segmented manifold projection into three-dimensional image data indicative of the one or more sub-objects utilizing the correspondence between the three-dimensional image data and the two-dimensional manifold projection.

19. The method of claim 18, wherein the adaptive erosion technique comprises:
comparing pixel values for pixels neighboring a first pixel to determine an erosion threshold for the first pixel;
comparing the erosion threshold for the first pixel to respective pixel values of the pixels neighboring the first pixel; and
eroding the first pixel if a predetermined number of the respective pixel values of the pixels neighboring the first pixel are below the erosion threshold for the first pixel.

20. The method of claim 19, wherein eroding the two-dimensional manifold projection comprises:
comparing pixel values for pixels neighboring a second pixel to determine an erosion threshold for the second pixel, wherein the erosion threshold for the second pixel is different than the erosion threshold for the first pixel;
comparing the erosion threshold for the second pixel to respective pixel values of the pixels neighboring the second pixel; and
eroding the second pixel if a predetermined number of the respective pixel values of the pixels neighboring the second pixel are below the erosion threshold for the second pixel.

* * * * *